Inventor
Frank Morse Robb
By Fetherstonhaugh & Co.
Attorneys

Oct. 19, 1954　　　F. M. ROBB　　　2,691,801
MOLDING PLASTIC IMPREGNATED MATERIAL
WITH COMPRESSIBLE MOLDS
Filed Aug. 12, 1949　　　2 Sheets-Sheet 2

Inventor
Frank Morse Robb
By Fetherstonhaugh & Co.
Attorneys

Patented Oct. 19, 1954

2,691,801

UNITED STATES PATENT OFFICE 2,691,801

MOLDING PLASTIC IMPREGNATED MATERIAL WITH COMPRESSIBLE MOLDS

Frank Morse Robb, Montreal, Quebec, Canada, assignor to Joseph Robb & Co. Limited, Montreal, Quebec, Canada Application August 12, 1949, Serial No. 109,838

2 Claims. (Cl. 18—55)

This invention relates to improvements in methods of moulding and to the provision of compressible moulds to be employed in the manufacture of pressed articles.

Heretofore it has been the accepted practice, in the manufacture of pressed articles made from plastics or plastic impregnated material, to provide permanent moulds and die platens in which the article of manufacture is pressed and cured according to any known method of pressure curing same. Such permanent moulds and die platens being made of cast steel, iron, or the like, are not only costly to produce but, in most cases, take a considerable length of time to produce.

In cases where large quantities of the pressed articles are to be manufactured and immediate production is not an essential factor, such permanent cast moulds and die platens become practical. However, where the quantity of articles required is relatively small the cost of producing a permanent cast mould and platen frequently increases the cost of each manufactured article to an amount which is out of proportion to the value of the finished article itself.

It is, therefore, the primary object of this invention to provide an inexpensive temporary mould which is suitable for the manufacture of pressed articles. This mould generally consists of a highly compressible material through which a vertical opening has been cut to any desired shape. The compressible mould is then placed between the upper and lower platens of a press and the vertical opening is partially filled with the plastic impregnated material to be compressed with the mould into the finished plastic article.

It is a further object of this invention to provide a method of moulding plastic impregnated material by subjecting the material to moulding pressure while said material is confined and limited in its lateral flow by the compressible mould which is similarly subjected to mold forming pressure.

The above and other objects and characteristic features of this invention will be more readily understood from the following detailed description taken in connection with the accompanying drawings, in which.

Figure 1:
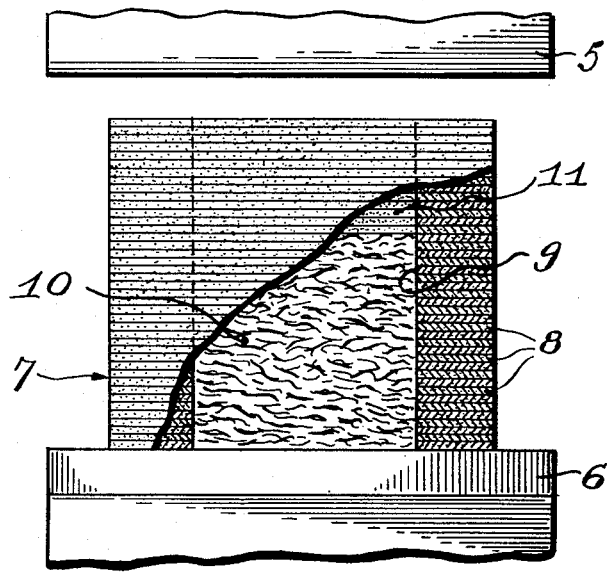
Fig. 1 is a side view in section illustrating an arrangement of a mould, with a filler therein, between upper and lower platens of a press.
Figure 2:
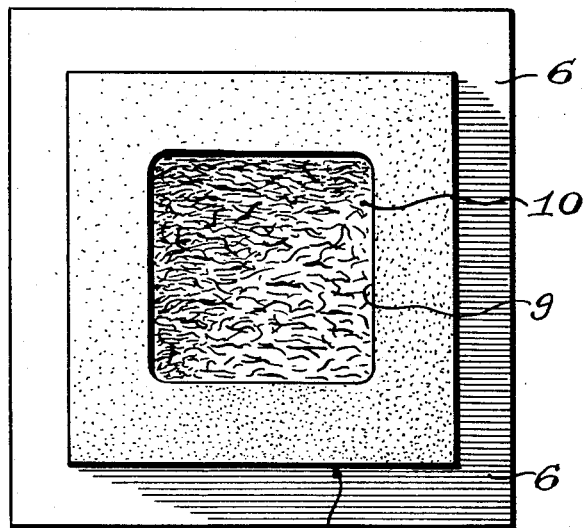
Fig. 2 is a top plan illustration of the type of mould shown in Fig. 1.

Proceeding now to a more detailed description, 5 and 6 represent the upper and lower platens of a hydraulic press. A compressible mould, generally indicated at 7, is mounted on the lower stationary platen 6, as shown in Fig. 1. For illustration purposes, I have shown sheets of compressible material 8 stacked in layers to a suitable height. These sheets are stamped out before stacking to provide an opening therethrough, which, when the sheets are stacked, will define a vertical opening 9 into which a loose mass 10 of resinous impregnated material to be moulded is deposited. The height of the mould will depend largely on the compressibility of the mould forming material. This height should, however, be substantially greater than the height of the loose mass of material to be moulded, leaving an empty pocket 11 above the mass 10.

Figures 3, 4:
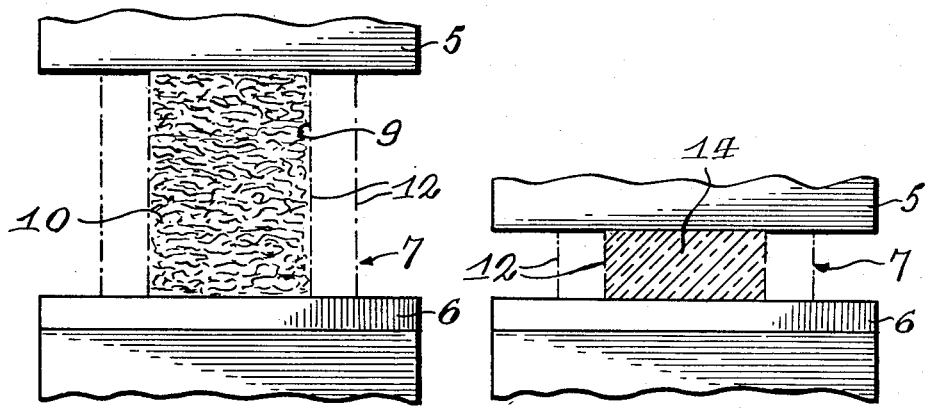
Fig. 3 is a diagrammatic view illustrating the first stage of compression of the mould shown in Fig. 1.
Fig. 4 is a further view illustrating in diagram the mould as it is compressed in the second stage to complete the moulded article.

In the first stage of the press operation, platen 5 compresses the mould 7 to the level of the loose mass 10, as indicated by dotted lines 12 in Fig. 3. This initial compression of the mould should be sufficient to ensure adequate density of the compressible mould in order to prevent lateral displacement of the material to be moulded during the compression operation of said last mentioned material.

The second stage of the press operation continues to compress the mould 7 to further densify it, as indicated by dotted lines in Figure 4, and to subject the loose material 10 to a "curing" process until it has been moulded into the finished article, as indicated at 14. The "curing" process consists of compressing the material to be moulded under heat to cause the resinous substance to flow throughout the material as it is compressed into the desired moulded article.

The mould itself may be formed from any suitable mass or layers of compressible material. For example, excelsior or other wood shavings, fibrous cotton, steel or aluminum wool, either in bulk or in layers of batts may be employed. The mould may also be suitably formed from sheets of compressible material stacked in layers to a suitable height. These sheets may be of cardboard, corrugated paper board, aluminum foil, either plain or corrugated, or cellulose cotton tissues.

When using a loose bulk or batts of highly compressible material the central portion is stamped or cut out leaving a vertical opening therethrough defining the shape of the desired moulded article. The bulk or batts should be large enough in their lateral dimensions to provide side walls about the material to be moulded of a substantial thickness sufficient to retain the material to be moulded while being subjected to the "curing" process. As this material requires considerable compression to attain the desired degree of density of the first stage process operation, the mould forming material may be compressed to the level of the bulk mass 10 and then additional layers are superimposed thereon and compressed until the desired density is reached. The mould is then in condition for the second stage or "curing" process of the material to be moulded.

The sheet material has certain advantages over the loose bulk in that it may be stamped to define more definite patterns for the mould. The sheets when stacked are more easily arranged with respect to the contours of their inner side walls to provide the vertical opening or mould. In addition, it has been found that, where the loose bulk of the mould tends to be displaced laterally during compression, there is little, if any, lateral displacement of the sheets during mould forming and moulding operations.

In both the bulk and sheet mould forming materials the metallic materials serve as heat conductors during the "curing" process which allows the resinous substance of the moulding material to flow more readily throughout the mass and more particularly adjacent the side edges thereof. The non-metallic material is more compressible but serves as an insulation to the heat which is applied during the pressing operation and it is, therefore, necessary to apply a greater amount of heat in order to have heat penetration to the portions of the moulding material adjacent the side walls of the mould.

Of the non-metallic sheet materials I have found that the corrugated paper board with a backing sheet on one side is the most desirable for forming the compressible moulds. These sheets should be stamped out so that, when stacked, each successive sheet will have its corrugations extending in a lateral direction opposite to the corrugations of the adjacent sheets. This arrangement provides a more even compression throughout the mould. The number of sheets required depends substantially on the compressibility of the moulding material as well as the volume of the loose mass to be moulded. However, with the use of the above corrugated paper board, I have found that, in most cases, approximately 40 sheets of standard corrugated paper board for every inch of finished moulded material will produce a satisfactory mould. The walls of the mould should be approximately 4" thick.

The resinous impregnated material to be moulded is the same as the material which is deposited in the conventional cast moulds for producing similar moulded articles. This material is fibrous and may be in the form of any suitable woven cloth, such as cotton rags, duck, canvas, asbestos or asbestos containing woven cloth. The material, impregnated with either a thermo-plastic or thermo-setting resin, is chopped up in the conventional manner or cut to preferred size before depositing in the mould. The volume of loose moulding material employed is comparable to that employed in the use of a conventional cast mould. This volume would vary according to the weight of the chopped mass; however the approximate ratio of the loose mass to the finished moulded article is about 5 to 1.

Figures 5, 6:
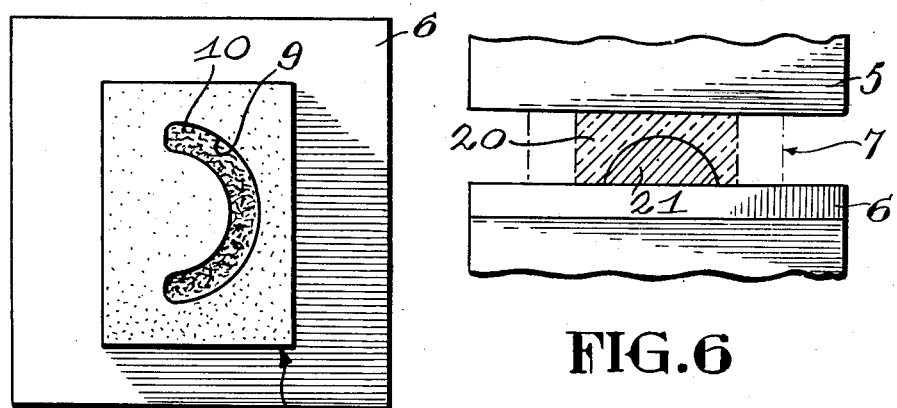
Fig. 5 is a top plan view showing a modified vertical opening or mould.
Fig. 6 is a modification of the view shown in Fig. 4.

In Figs. 1 to 4 inclusive, I have shown a rectangular vertical opening or mould 9 for illustrative purposes only. The mould may be of any desired shape such as the crescent or semicircular shaped mould, shown in Fig. 5, which is intended to represent a mould for a half section of a collar to be fitted about any suitable shaft. In Fig. 6 I have shown a moulded sleeve 20 which was formed by the introduction of a semi-circular form 21 beneath the loose mould forming material prior to the press operation.

When the "curing" step of the press operation has been completed, the compressed mould with the moulded article is removed from between the platens of the press. The mould is then stripped from around the moulded article in any suitable manner and the moulded article is trimmed to remove any undesired portion thereof.

With the compressible type mould according to my invention it is desirable to make the mould larger than the desired size of the finished article. The reason for this is that there will be a slight amount of lateral displacement both of the compressible mould forming material and the resinous substance of the moulding material. This produces a small amount of waste of the moulding material but the cost of this waste together with the cost of the compressible mould forming material is relatively small in comparison with the cost of a cast mould. Not only is the cost of moulding greatly reduced where the articles to be moulded are few but the setting up of a compressible mould may be completed within an hour's time. Thus, in many cases where early production is a factor the compressible mould may be employed while waiting for the production and set-up of a cast mould.

I claim:

1. A method of moulding a plastic article between upper and lower horizontal platens of a press which comprises mounting on the lower platen a plurality of corrugated sheets of compressible mould forming material in stacked relation, each of said sheets being stamped out in the central portion to define a vertical article defining opening therethrough when arranged in stacked relation, partially filling said opening with a plastic impregnated material, operating said press to initially compress said sheets between the platens only to a degree of density which will prevent penetration of the plastic impregnated material between said sheets, and then simultaneously subjecting said sheets and said plastic impregnated material to a predetermined degree of compression for moulding said impregnated material into a finished article between said platens.

2. A method of moulding, as set forth in claim 1, including the steps of arranging said sheets in stacked relation with the corrugations of each successive sheet extending in the opposite direction to adjacent sheets.

References Cited in the file of this patent

UNITED STATES PATENTS

| Number | Name | Date |
|---|---|---|
| 660,221 | Potter | Oct. 23, 1900 |
| 1,257,325 | DeLavaud | Feb. 26, 1918 |
| 1,320,744 | DeLavaud | Nov. 4, 1919 |
| 1,664,296 | Hamerstadt | Mar. 27, 1928 |
| 1,897,023 | Schirmer | Feb. 7, 1933 |
| 1,899,393 | Meyer | Feb. 28, 1933 |
| 2,075,507 | Crowell | Mar. 30, 1937 |
| 2,152,738 | Jeffery | Apr. 4, 1939 |
| 2,172,243 | Goodnow et al. | Sept. 5, 1939 |
| 2,274,060 | Hart | Feb. 24, 1942 |
| 2,297,017 | Overman | Sept. 29, 1942 |
| 2,622,276 | Wilson | Dec. 23, 1952 |